United States Patent
Liu

(10) Patent No.: US 10,297,240 B2
(45) Date of Patent: May 21, 2019

(54) IMAGE PRODUCTION SYSTEM AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Cheng-Xiang Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 114 days.

(21) Appl. No.: 15/393,281

(22) Filed: Dec. 29, 2016

(65) Prior Publication Data

US 2017/0330543 A1 Nov. 16, 2017

(30) Foreign Application Priority Data

May 12, 2016 (CN) .......................... 2016 1 0316291

(51) Int. Cl.

| | |
|---|---|
| *H04N 5/262* | (2006.01) |
| *G10H 1/36* | (2006.01) |
| *G06K 9/46* | (2006.01) |
| *H04N 9/12* | (2006.01) |
| *G06K 9/00* | (2006.01) |
| *G06T 19/00* | (2011.01) |
| *H04N 9/75* | (2006.01) |

(52) U.S. Cl.
CPC ......... *G10H 1/368* (2013.01); *G06K 9/00248* (2013.01); *G06K 9/4604* (2013.01); *G06T 19/006* (2013.01); *H04N 5/2621* (2013.01); *H04N 5/2624* (2013.01); *H04N 9/12* (2013.01); *H04N 9/75* (2013.01)

(58) Field of Classification Search
CPC ...... H04N 5/2621; H04N 5/2624; H04N 9/12; H04N 9/75; G06T 19/006; G06T 7/20; G06T 2207/10024; G06T 2207/10016; G06T 2207/30201; G06K 9/4604; G06K 9/00248; G10H 1/368
See application file for complete search history.

(56) References Cited

U.S. PATENT DOCUMENTS

| | | | | |
|---|---|---|---|---|
| 6,086,380 A | * | 7/2000 | Chu ...................... | G07F 17/26 386/308 |
| 7,053,915 B1 | * | 5/2006 | Jung ..................... | G10H 1/368 345/629 |
| 7,963,059 B2 | * | 6/2011 | Fritsche .............. | G09F 15/0025 40/603 |
| 8,091,605 B1 | * | 1/2012 | Melhart ................ | G10K 11/20 160/135 |
| 8,465,366 B2 | * | 6/2013 | Applewhite ........... | G10H 1/368 463/36 |

(Continued)

*Primary Examiner* — Lin Ye
*Assistant Examiner* — John H. Morehead, III
(74) *Attorney, Agent, or Firm* — ScienBiziP, P.C.

(57) ABSTRACT

A system for image production in a KTV setting uses more than one display screen, a first screen for displaying a star MV and a song menu and a second screen for images of a singer as captured by cameras within the KTV setting. The system includes a capturing unit and a processing unit. The capturing unit captures images of the singer. The processing unit produces a singer MV according to the images of the single or plurality of singers, which can be enhanced with special effects, and displays the singer MV on the second screen.

10 Claims, 15 Drawing Sheets

(56) References Cited

U.S. PATENT DOCUMENTS

| | | | |
|---|---|---|---|
| 2003/0027120 A1* | 2/2003 | Jean | G10H 1/361 434/307 A |
| 2003/0100965 A1* | 5/2003 | Sitrick | G09B 15/023 700/83 |
| 2003/0137728 A1* | 7/2003 | Kuroda | G03B 21/60 359/455 |
| 2006/0292537 A1* | 12/2006 | Nute | G09B 5/06 434/307 A |
| 2007/0292831 A1* | 12/2007 | Lee | G10H 1/368 434/307 A |
| 2008/0068473 A1* | 3/2008 | Ryckman | G03B 17/53 348/239 |
| 2008/0184870 A1* | 8/2008 | Toivola | G10H 1/365 84/610 |
| 2008/0299530 A1* | 12/2008 | Veitch | G10H 1/32 434/307 A |
| 2009/0031885 A1* | 2/2009 | Bennetts | G10H 1/0058 84/610 |
| 2013/0070093 A1* | 3/2013 | Rivera | G11B 27/002 348/143 |
| 2013/0185069 A1* | 7/2013 | Tanaka | G10L 15/28 704/235 |
| 2014/0081797 A1* | 3/2014 | Rivera | G11B 27/002 705/26.5 |
| 2014/0205261 A1* | 7/2014 | Courtemanche | H04N 5/772 386/224 |
| 2014/0333724 A1* | 11/2014 | Ego | H04N 13/128 348/46 |
| 2015/0080072 A1* | 3/2015 | Kim | A63F 13/213 463/7 |
| 2016/0063317 A1* | 3/2016 | Nagai | A63F 13/814 434/247 |
| 2016/0071428 A1* | 3/2016 | Murakami | G06K 9/00255 382/103 |

* cited by examiner

IMAGE PRODUCTION SYSTEM AND METHOD

FIELD

The subject matter herein generally relates to image production systems.

BACKGROUND

In general, karaoke television (KTV) is equipped with two display devices, but the two display devices show the same pictures, that is only an MV and lyrics prompts.

BRIEF DESCRIPTION OF THE DRAWINGS

Implementations of the present technology will now be described, by way of example only, with reference to the attached figures.

DETAILED DESCRIPTION

Figure 1:
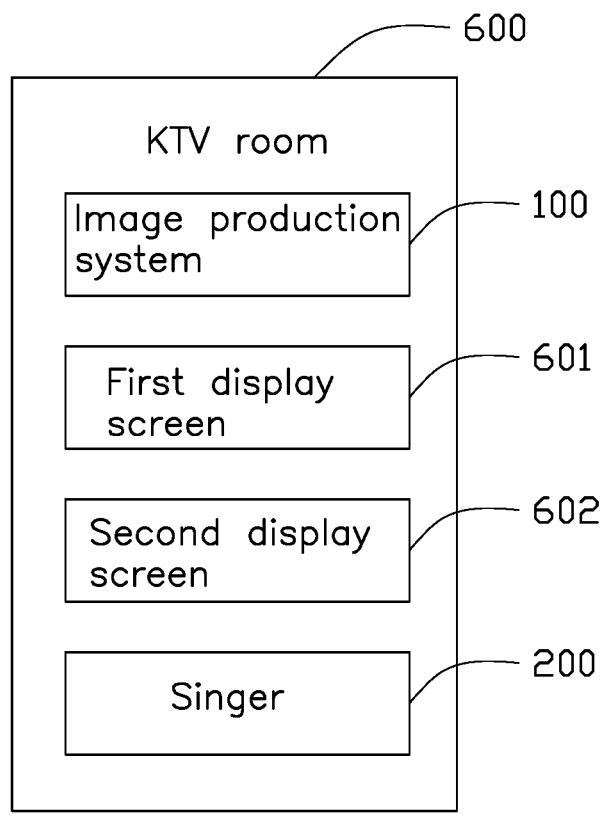
FIG. 1 is a block diagram of an embodiment of the present disclosure of a KTV room with an image production system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates an image production system 100 which is installed in a KTV room 600.

The KTV room 600 comprises a first display screen 601, a second display screen 602, and a singer 200. The first display screen 601 and the second display screen 602 are installed on a wall facing directly in the KTV room 600. The first display screen 601 is configured to display a menu and a music video (MV) image screen with the lyrics prompt.

Figure 2:
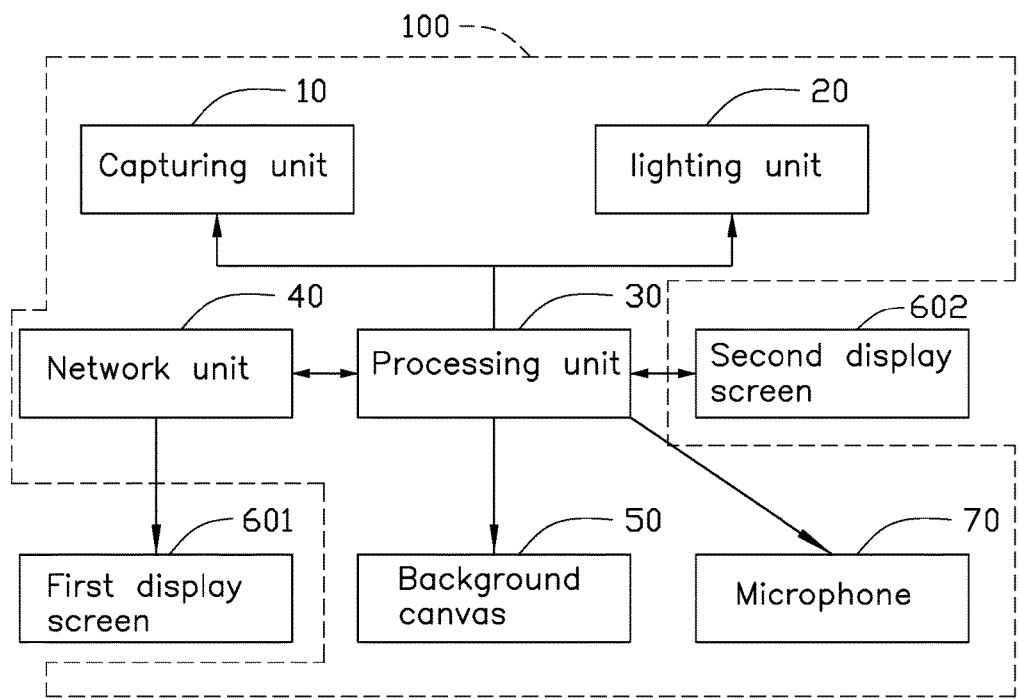
FIG. 2 is a block diagram of a first embodiment of the image production system.

FIG. 2 illustrates that the image production system 100 comprises a capturing unit 10, a processing unit 30, a network unit 40, a background canvas 50, and a microphone 70. The processing unit 30 is connected to the capturing unit 10, the second display screen 602, the network unit 40, the background canvas 50, and the microphone 70. The network unit 40 is connected to the first display screen 601.

The image production system 100 further comprises a lighting unit 20. The lighting unit 20 is electrically coupled to the processing unit 30. The lighting unit 20 emits light in three colors, red, green, and blue.

Figure 3:
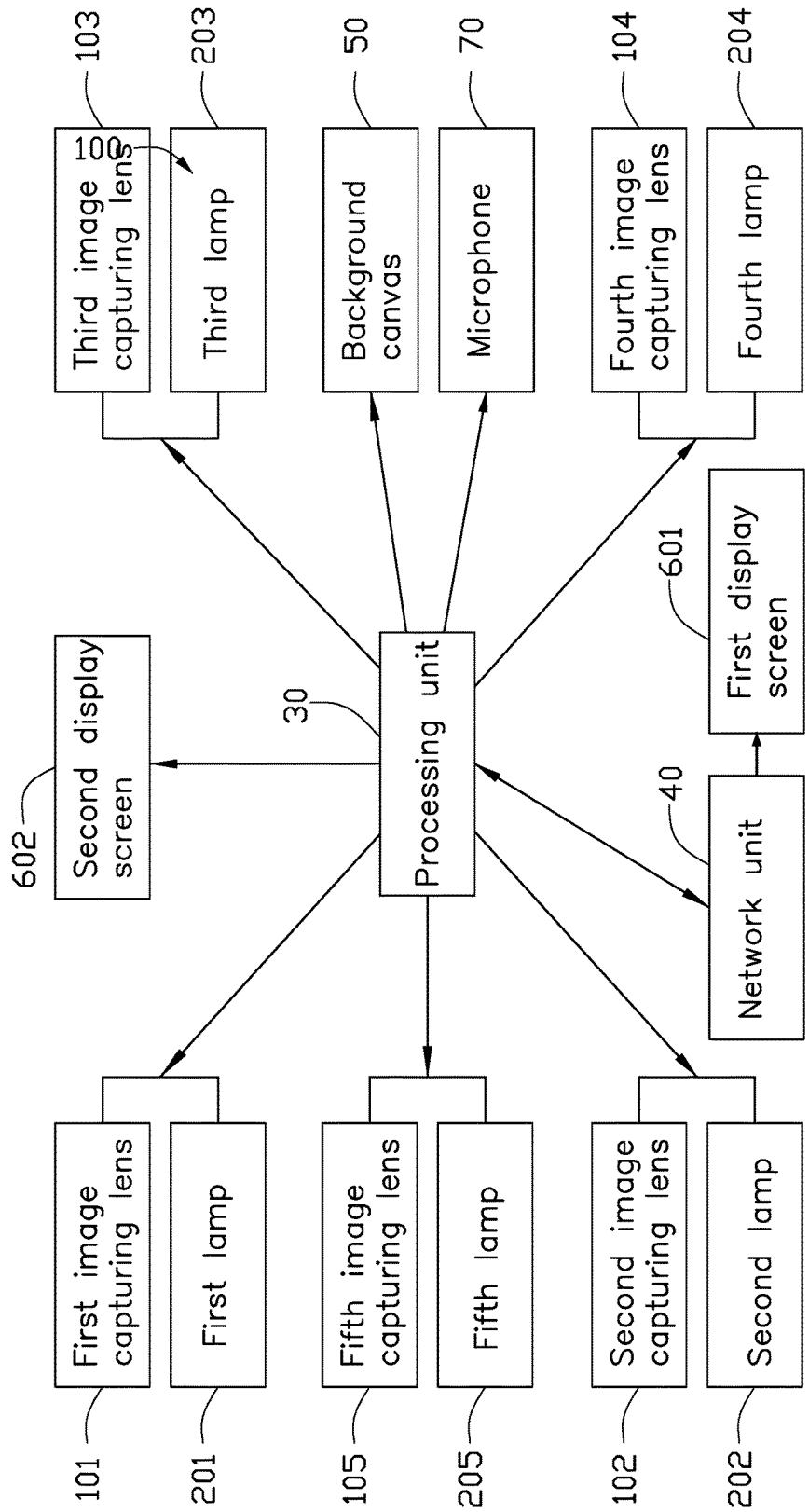
FIG. 3 is a block diagram of a second embodiment of the image production system.

FIG. 3 illustrates that the capturing unit 10 comprises a first image capturing lens 101, a second image capturing lens 102, a third image capturing lens 103, a fourth image capturing lens 104, and a fifth image capturing lens 105. The first image capturing lens 101, the second image capturing lens 102, the third image capturing lens 103, and the fourth image capturing lens 104 are installed in the four corners of the KTV room 600. The fifth image capturing lens 105 is installed at a position between the first display screen 601 and the second display screen 602. The fifth image capturing lens 105 acquires an image of the singer 200 which includes the background canvas 50. The first image capturing lens 101, the second image capturing lens 102, the third image capturing lens 103, the fourth image capturing lens 104, and the fifth image capturing lens 105 can be depth image capturing lenses.

The capturing unit 10 acquires the image information in the KTV room 600 at 360-degree viewing angles, and transmits the image information to the processing unit 30. In at least one embodiment, the processing unit 30 can be a micro processor.

The lighting unit 20 comprises a first lamp 201, a second lamp 202, a third lamp 203, a fourth lamp 204, and a fifth lamp 205. The first lamp 201, the second lamp 202, the third lamp 203, and the fourth lamp 204 are installed in the corners of the KTV room 600. The fifth lamp 205 is a white light. The fifth lamp 205 assists the image capturing lens 105 to acquire clear images of human body and face.

The lighting unit 20 is installed within a preset distance of the capturing unit 10. The lamps (201, 202, 203, 204, 205) are respectively installed within the preset distance of the image capturing lenses (101, 102,103, 104, 105). The first lamp 201 is installed within the preset distance of the first image capturing lens 101. The second lamp 202 is installed within the preset distance of the second image capturing lens 102. The third lamp 203 is installed within the preset distance of the third image capturing lens 103. The fourth lamp 204 is installed within the preset distance of the fourth image capturing lens 104. The fifth lamp 205 is installed within the preset distance of the fifth image capturing lens 105.

The preset distance (for example, 30 cm) ensures that the light emitted by the lighting unit 20 does not affect the picture quality acquired by the capturing unit 10.

The processing unit 30 obtains the image information from the capturing unit 10. The processing unit 30 edits the image information as a singer MV image and displays the singer MV image on the second display screen 602. The network unit 40 stores the singer MV image edited by the processing unit 30.

The network unit 40 can communicate with a portable communication device.

Figure 4:
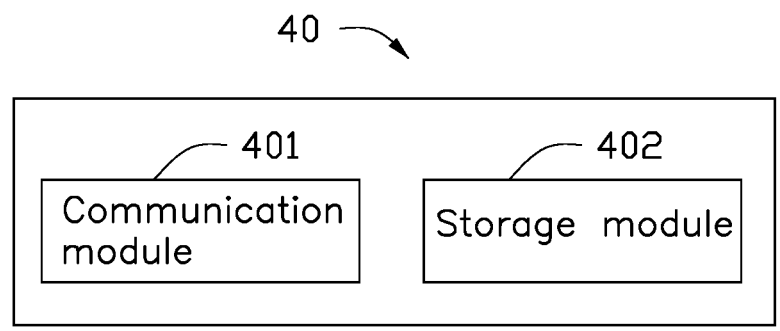
FIG. 4 is a schematic diagram of a network unit of the system of FIG. 2.

FIG. 4 illustrates that the network unit 40 comprises a communication module 401 and a storage module 402.

The singer 200 can wirelessly communicate with the communication module 401 of the network unit 40 through a portable communication device. The portable communication device may be a smart phone or a tablet computer. The portable communication device downloads the singer MV image stored in the storage module 402.

In order to further protect the privacy of the user, the network unit 40 may also automatically delete data stored in the storage module 402 when turned on or off or when restarted.

Figure 5:
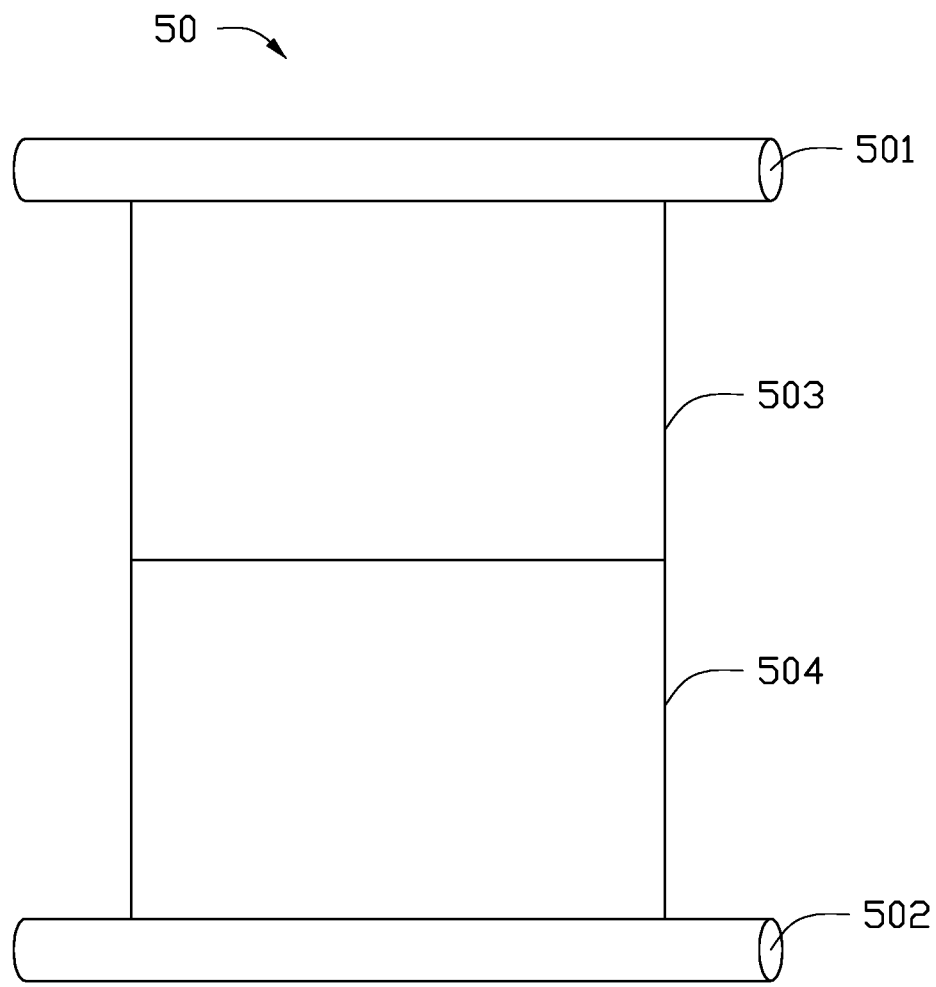
FIG. 5 is a schematic diagram of a background canvas of the system of FIG. 2.

FIG. 5 illustrates that the background canvas 50 comprises a first canvas 503 in the upper half portion and a second canvas 504 in the lower half portion. The first canvas 503 adopts a first color, and the second canvas 504 adopts a second color.

The color of the first canvas 503 is green. The color of the second canvas 504 is blue.

The background canvas 50 further comprises a first spool 501 and a second spool 502.

The first spool 501 is configured to roll up or unroll the first canvas 503. The second spool 502 is configured to roll up or unroll the second canvas 504.

Both the first spool 501 and the second spool 502 are connected to a motor (not shown in figures). The motor can wirelessly communicate with the processing unit 30. The motor drives the first spool 501 and the second spool 502 under the control of the processing unit 30.

The background canvas 50 is mounted on a wall opposite to the fifth image capturing lens 105. When the singer 200 stands in front of the background canvas 50, the fifth image capturing lens 105 is capable of capturing the image of the singer 200 including the image of the background canvas 50.

The processing unit 30 can switch the background color of the background canvas 50 according to the clothing color of the singer 200. For example, when the capturing unit 10 acquires the clothing color of the singer 200 as green or tending to be green, the processing unit 30 controls the motor to drive the first spool 501 to roll up the first canvas 503. The second canvas 504 is unrolled, thus the background color of the background canvas 50 is adjusted to blue.

When the capturing unit 10 acquires the clothing color of the singer 200 as blue or tending to be blue, the processing unit 30 controls the motor to drive the second spool 502 to roll up the second canvas 504. The first canvas 503 is unrolled, thus the color of the background canvas 50 is adjusted to green.

Figure 6:
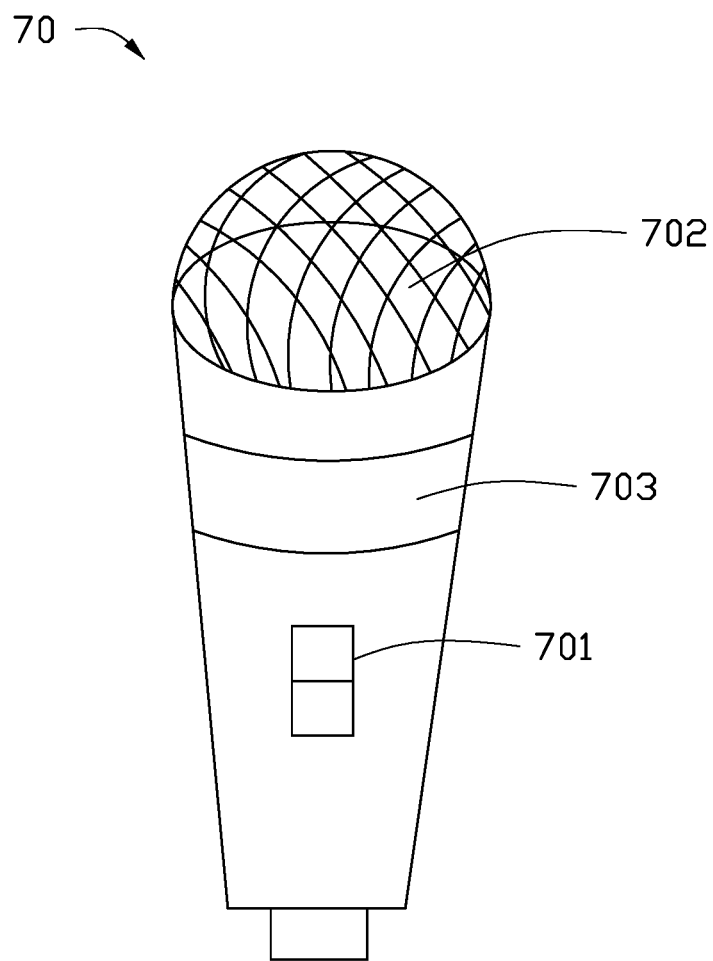
FIG. 6 is a schematic diagram of a microphone of the system of FIG. 2.

FIG. 6 illustrates that the microphone 70 comprises a switch 701, a dust cover 702, and a light emitting ring 703.

The light emitting ring 703 is installed above the switch 701 and below the dust cover 702. The light emitting ring 703 is configured to position the microphone 70 and to determine the number of singers.

When the switch 701 is turned on, the light emitting ring 703 emits red light.

Figure 8:
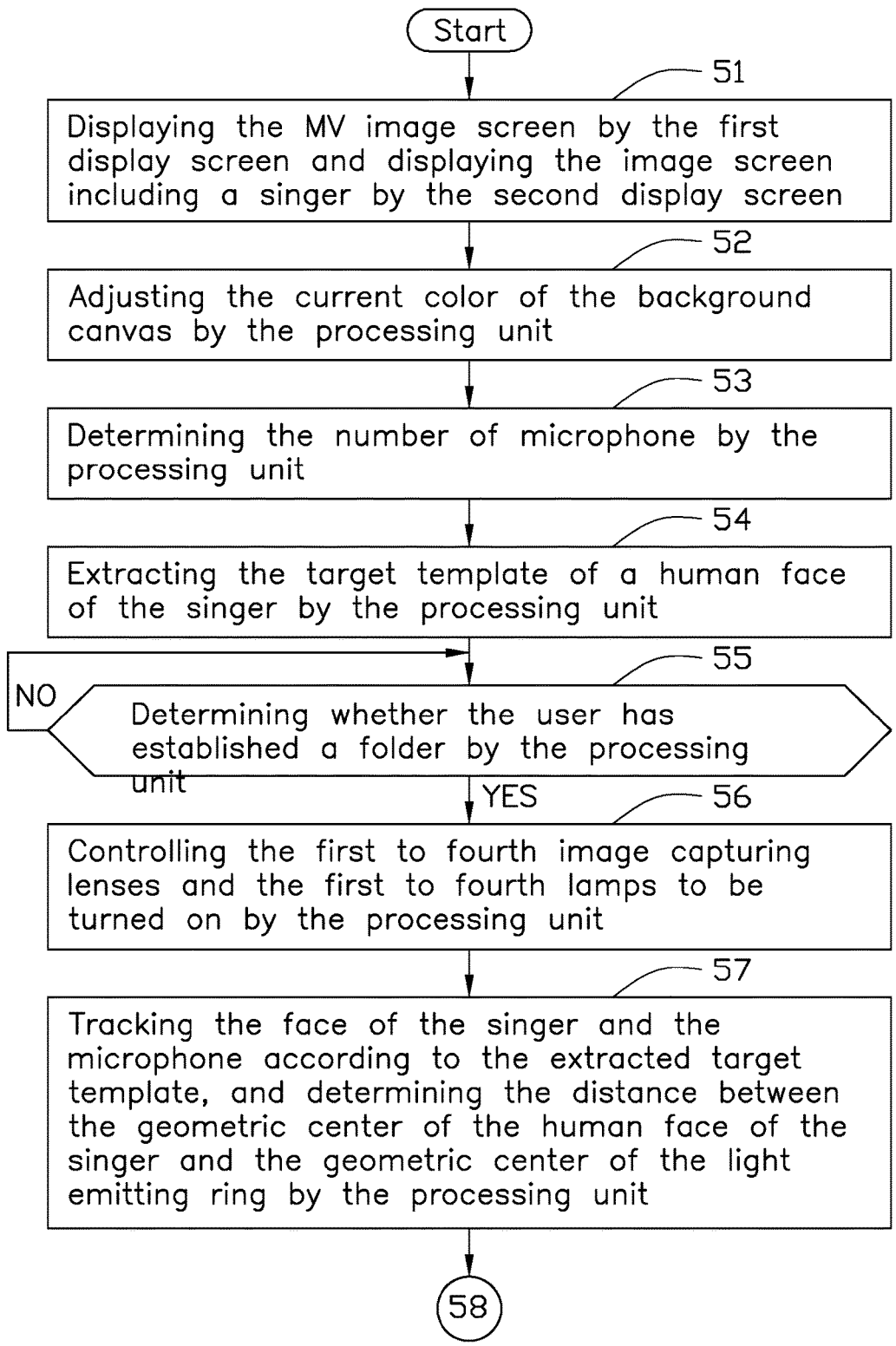
FIG. 8 is a flow diagram of an embodiment of an image production method.
Figure 9:
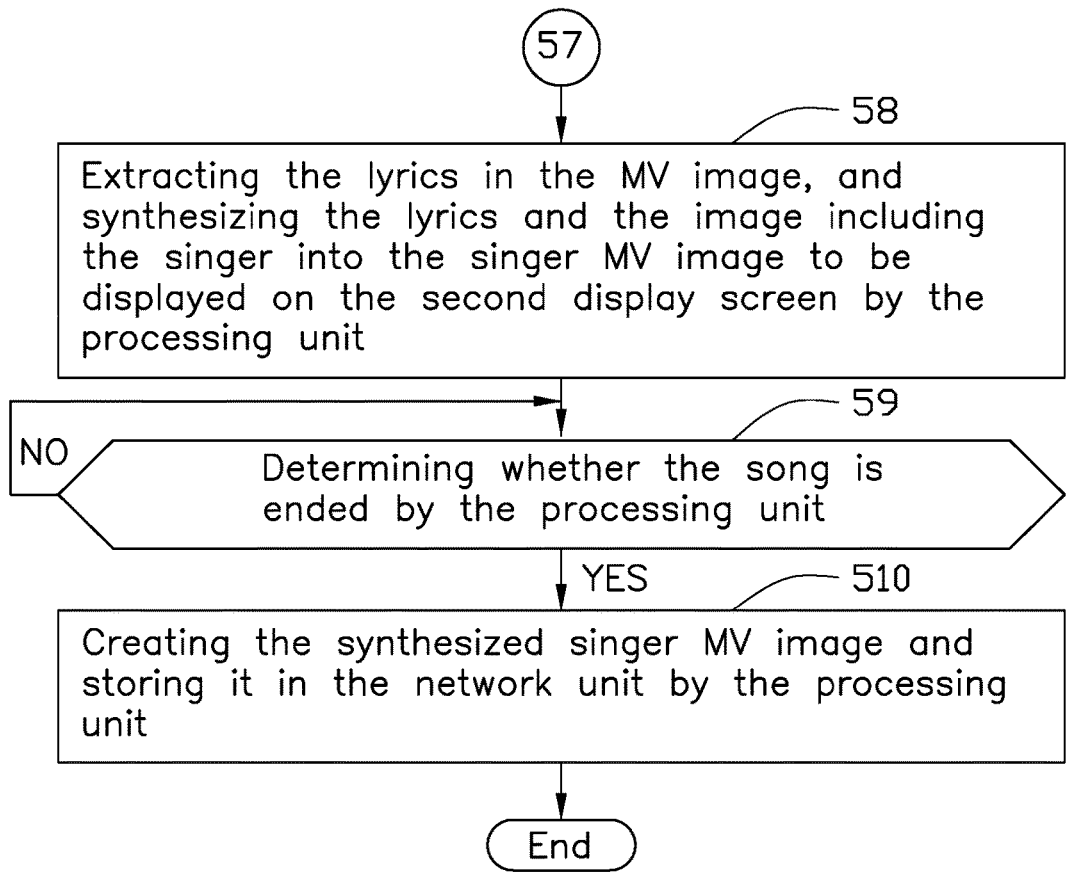
FIG. 9 is a flow diagram of another embodiment of an image production method.

FIGS. 8 and 9 illustrates that the processing unit 30 recognizes the human face of the singer 200 and further extracts a target template 80 of the face of the singer 200.

FIG. 8 illustrates a flow diagram of an embodiment of the present disclosure of an image production method. A flowchart is presented in accordance with an example embodiment which is being thus illustrated. The example method is provided by way of example, as there are a variety of ways to carry out the method. The method described below can be carried out using the configurations illustrated in FIG. 1, for example, and various elements of these figures are referenced in explaining example method. Blocks shown in FIG. 8 represents one or more processes, methods, or subroutines, carried out in the test method. Furthermore, the illustrated order of blocks is by example only and the order of the blocks can change. Additional blocks may be added or fewer blocks may be utilized, without departing from this disclosure. The method can begin at block 51.

At block 51, the fifth image capturing lens 105 and the fifth lamp 205 are turned on. The first display screen 601 displays an MV image screen, and the second display screen 602 displays a video screen including the singer 200, collected by the fifth image capturing lens 105.

The first display screen 601 may also display a menu. The singer 200 can select a song through the menu. When the singer 200 is selecting the song, the processing unit 30 sends a radio control signal to control the fifth image capturing lens 105 and the fifth lamp 205 to be turned on. After the singer 200 has selected the song, the first display screen 601 displays the MV image screen corresponding to the song selected by the singer 200.

At block 52, the processing unit 30 adjusts the current color of the background canvas 50 so the current color of the background canvas 50 is different from the clothing color of the singer 200.

The fifth image capturing lens 105 acquires the image information which includes the singer 200 and the background canvas 50, and transmits the image information to the processing unit 30. The processing unit 30 determines the color of the clothes of the singer 200 by analyzing the image information to further adjust the current color of the background canvas 50.

The processing unit 30 first determines the color at the corner (such as upper left corner, or lower right corner) of the image to determine the current color of the background canvas 50. The processing unit 30 subtracts each pixel value of the image from the pixel value of the current color of the background canvas 50, and then performs connectivity process. Finally, the number of holes in the image after the connectivity process is determined.

If the number of holes is less than a threshold value N, the color of the clothes of the singer 200 is determined to be the same as the current color of the background canvas 50. The processing unit 30 controls the background canvas 50 to switch the current color of the canvas. For example, when green is the current color of the background canvas 50 and of the clothes of the singer 200, the processing unit 30 controls the background canvas 50 to switch to blue. When blue is the current color of the background canvas 50 and of the clothes of the singer 200, the processing unit 30 controls the background canvas 50 to switch to green.

At block 53, the number of microphones 70 is determined.

The processing unit 30 determines the number of microphones 70 by detecting the amount of light emitted by the light emitting ring 703.

Figure 7:
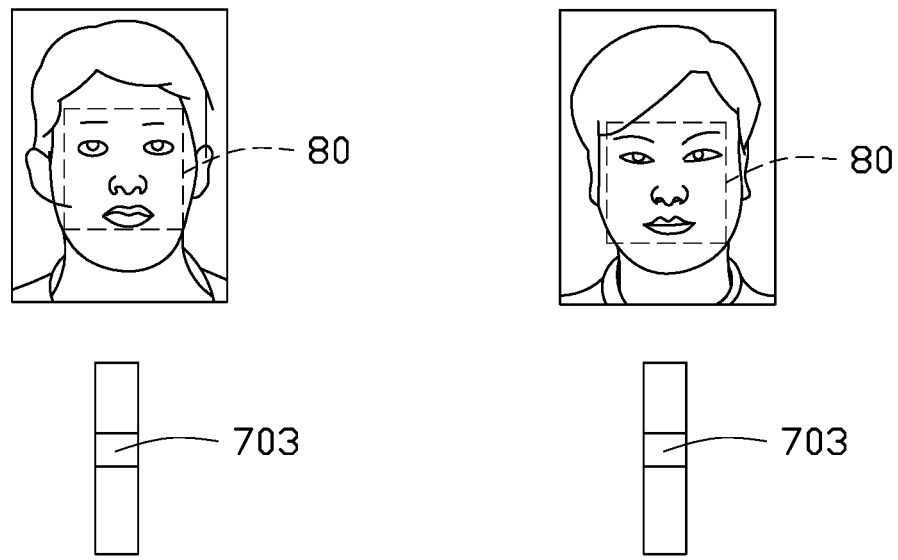
FIG. 7 is a schematic diagram of a face and target template in the system of FIG. 2.

At block 54, the target template 80 is used for extracting a human face of the singer. The target template 80 of the face of the singer 200 is shown in FIG. 7.

At block 55, determining whether the user has established a folder.

If the user has set up a folder in the network unit 40, block 56 is implemented, otherwise the process returns to block 55. The folder is configured for storing the singer MV image.

At block 56, the processing unit 30 controls the first to fourth image capturing lenses (101, 102, 103, 104) and the first to fourth lamps (201, 202, 203, 204) to be turned on. The first display screen 601 displays the MV image screen.

The processing unit 30 transmits radio control signals to control all of the first to fourth image capturing lenses (101, 102, 103, 104) and the first to fourth lamps (201, 202, 203, 204) to be turned on.

At block 57, the processing unit 30 tracks the face of the singer 200 according to the extracted target template 80, and also the microphone 70. The distance between the geometric center of the human face of the singer 200 and the geometric center of the light emitting ring 703 is determined.

The processing unit 30 controls the scaling of the image on the second display screen 602 according to the distance.

When the distance between the geometric center of the human face of the singer 200 and the geometric center of the light emitting ring 703 is less than or equal to a first preset distance, the image on the second display screen 602 is enlarged and displayed around the face region of the singer 200. The smaller the distance between the geometric center of the human face of the singer 200 and the geometric center of the microphone 70, the greater is the amount of the image on the second display screen 602 placed around the face region of the singer 200.

When the distance between the geometric center of the human face of the singer 200 and the geometric center of the light emitting ring 703 is larger than the first preset distance and smaller than the second preset distance, the image on the second display screen 602 is not enlarged in the display. That is, a half-body image of the singer holding the smart microphone 70 is displayed on the second display screen 602.

When the distance between the geometric center of the human face of the singer 200 and the geometric center of the light emitting ring 703 is equal to or greater than the second preset distance, the image on the second display screen 602 is displayed in a reduced size around the face region of the singer 200. That is, a picture of the whole person of the singer 200 is displayed on the second display screen 602.

The processing unit 30 also selects different conversion effects according to the conversion rate of the song tunes sung by the singer 200.

The processing unit 30 samples the voices of the singer 200.

If the singer's singing voice frequency is faster and the amplitude changes only a little, the singer 200 is the rap rhythm, and the image on the second display screen 602 is displayed in a pan.

If the singer 200's singing voice frequency is slower and the amplitude changes only a little, the singer 200 is tending to end. The processing synthesizes the image acquired by fifth image capturing lens 105 and the images acquired by the first to fourth image capturing lenses (101, 102, 103, 104).

If the singer 200's singing voice frequency is slower and the amplitude changes only a little, the RGB value and the chroma of the image on the second display screen 602 can be adjusted accordingly.

At block 58, the processing unit extracts the lyrics in the MV image, and synthesizes the lyrics and the image including the singer 200 into a singer MV image to be displayed on the second display screen 602.

The MV image is displayed on the first display screen 601, and the image including the singer is acquired by the fifth image capturing lens 105.

At block 59, the processing unit determines when the song is ended.

The end of the song is determined by the countdown of the MV image in the first display screen 601. If the song is ended, block 510 is implemented, otherwise the process returns to block 59.

At block 510, the processing unit 30 creates a synthesized singer MV image and stores it in the network unit 40.

Figure 10:
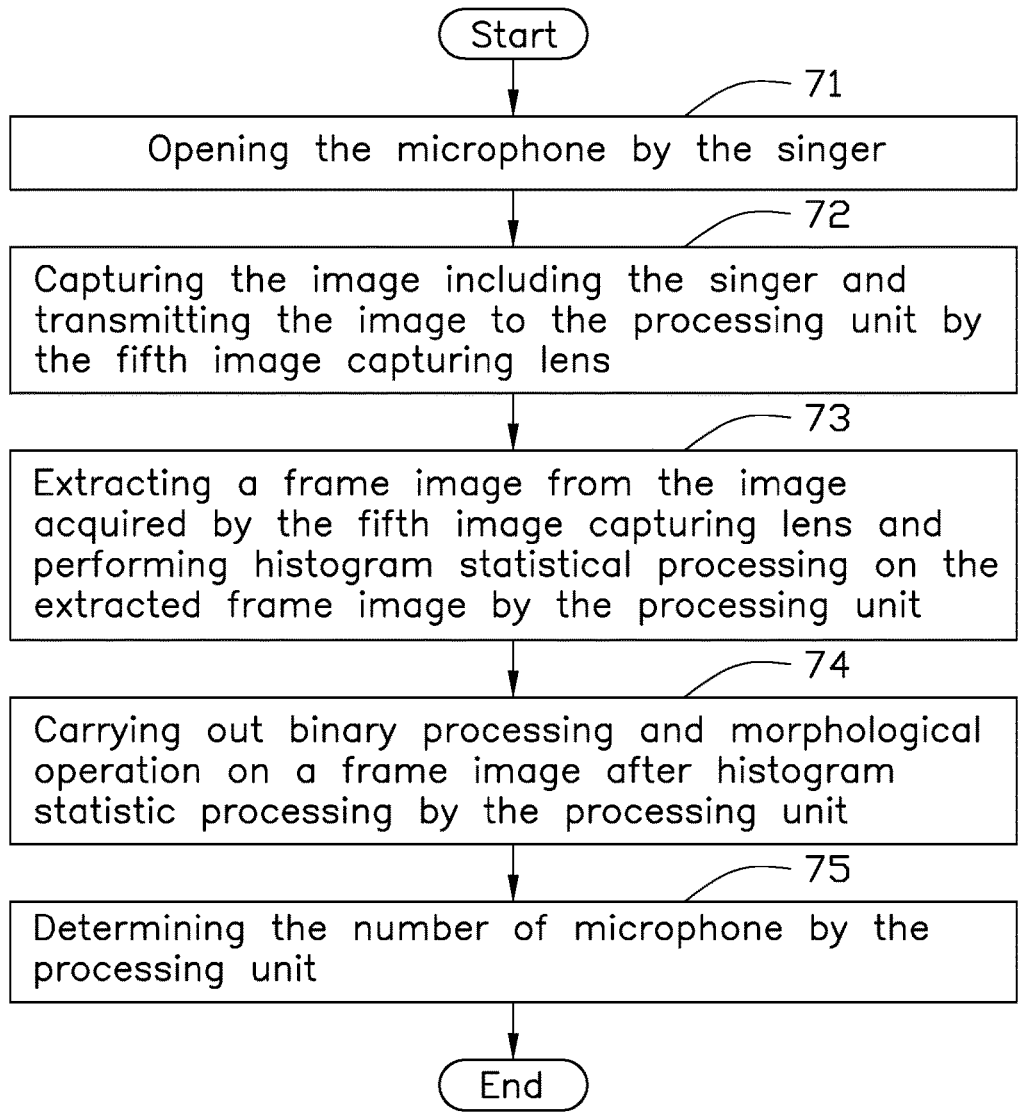
FIG. 10 is a flow diagram of determining the number of microphones in the method of FIG. 8.

FIG. 10 illustrates a flow diagram of an embodiment of determining the number of microphones.

At block 71, the singer 200 activates the microphone 70.

When the singer 200 activates the microphone 70 to start singing, the microphone 70 is lifted to the chest position and the glowing ring 703 of the microphone 70 is not covered.

At block 72, the fifth image capturing lens 105 acquires the image including the singer 200 and transmits the acquired image to the processing unit 30.

At block 73, the processing unit 30 extracts a frame from the images acquired by the fifth image capturing lens 105 and performs histogram statistical processing on the extracted one frame image.

The processing unit 30 receives the fifth image capturing lens 105 to acquire the image including a singer, and extracts a frame from the images according to a preset extraction rule. The extraction rule can be a frame at a predetermined time or a frame at a predetermined position within all the images.

At block 74, the processing unit 30 carries out binary processing and morphological operation on a frame after histogram statistic processing.

The binary processing is performed by setting a red pixel of the image, after one histogram statistic processing, to 1 and setting a non-red pixel to 0. The morphological operation is performed on the binarized image.

At block 75, the processing unit 30 determines the number of microphones 70.

The processing unit 30 counts the number of red pixel blocks in the image, and the number of microphones 70 can be obtained. For example, if the number of red pixel blocks in the image is 1, it can be determined that the number of the microphones 70 is only 1.

Figure 11:
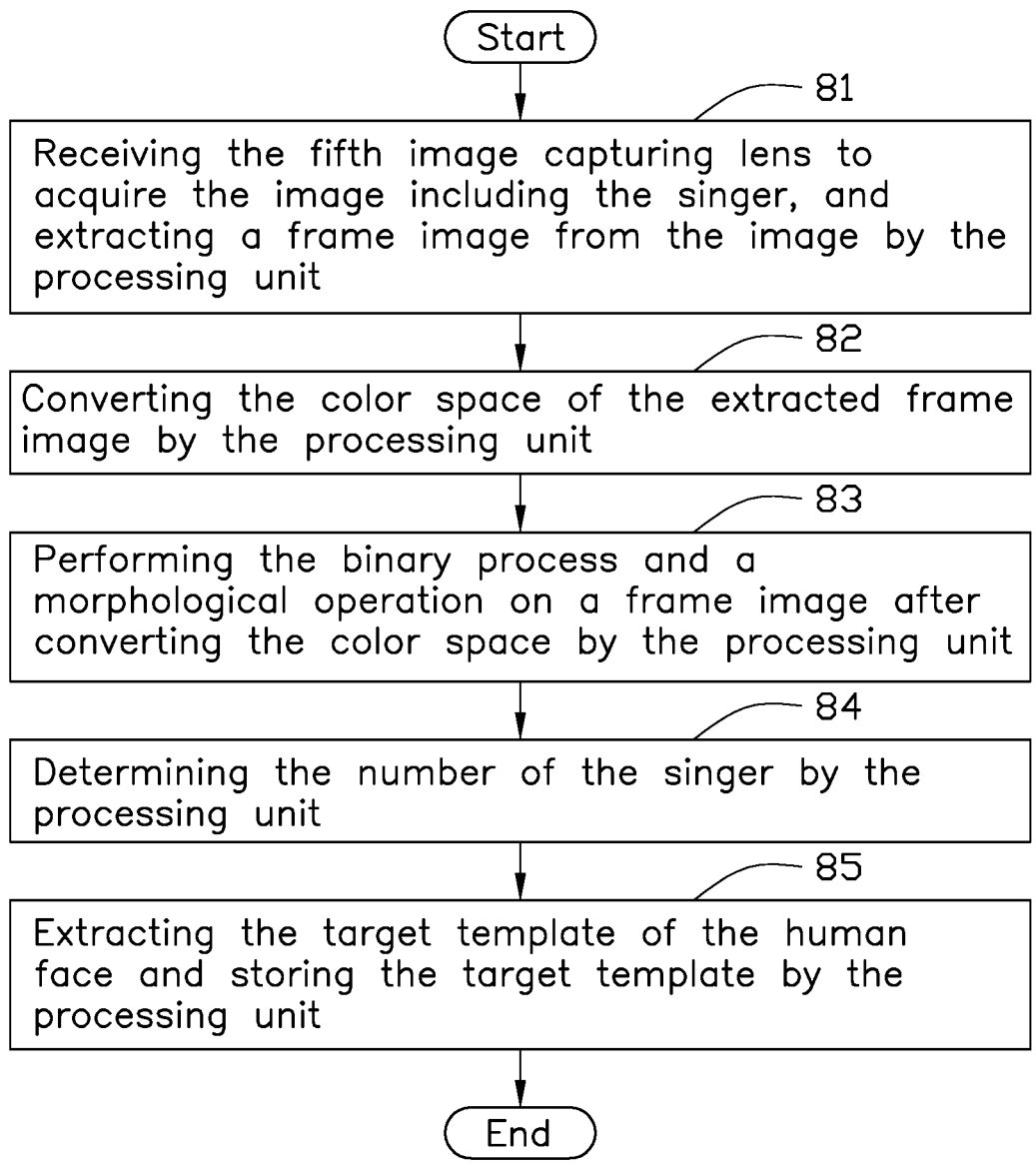
FIG. 11 is a flow diagram of extracting the face target template in the method of FIG. 8.

FIG. 11 illustrates a flow diagram of an embodiment of extracting the target template for the face of the singer 200 in the method.

At block 81, the processing unit 30 extracts a frame from the images acquired by the fifth image capturing lens 105 and performs histogram statistical processing on the extracted frame.

The processing unit 30 receives signals from the fifth image capturing lens 105 to acquire the image including the singer 200, and extracts a frame from the images according to a preset extraction rule. The extraction rule can be a frame at a predetermined time or a predetermined position.

At block 82, the processing unit 30 converts the color space of the extracted frame.

The processing unit 30 converts the color space of the image from the RGB space model to the YCrCb model. The conversion formula from RGB color space to YCrCb color space is as follows:

$$Y=0.2990*R+0.5780*G+0.1140*B+0.$$

$$Cr=0.5000*R-0.4187*G-0.0813*B+128.$$

$$Cb=-0.1687*R-0.3313*G+0.5000*B+128.$$

At block 83, the processing unit 30 performs a binary process and a morphological operation on a frame after converting the color space.

Specifically, the Cr component in the interval [140, 160] is extracted, and the Cr component in the interval is binarized to 1. All Cr components other than the interval are binarized to 0, and the binarized image is denoised and morphologically processed.

At block 84, the processing unit 30 determines the number of the singers 200.

The processing unit 30 counts the number of pixel groups in the image after morphological operations, and the number of pixel groups represents the number of singers 200.

At block 85, the target template 80 for extracting the human face of the singer 200 is stored.

Each pixel group in the image is projected in the X-axis and Y-axis to get the smallest face of the external rectangle. FIG. 7 shows this in the rectangular box.

A fixed-size pixel block in the middle of the minimum circumscribed rectangle is selected as the target template 80. The X-axis refers to a horizontal direction, and the Y-axis refers to a vertical direction.

Figure 12:
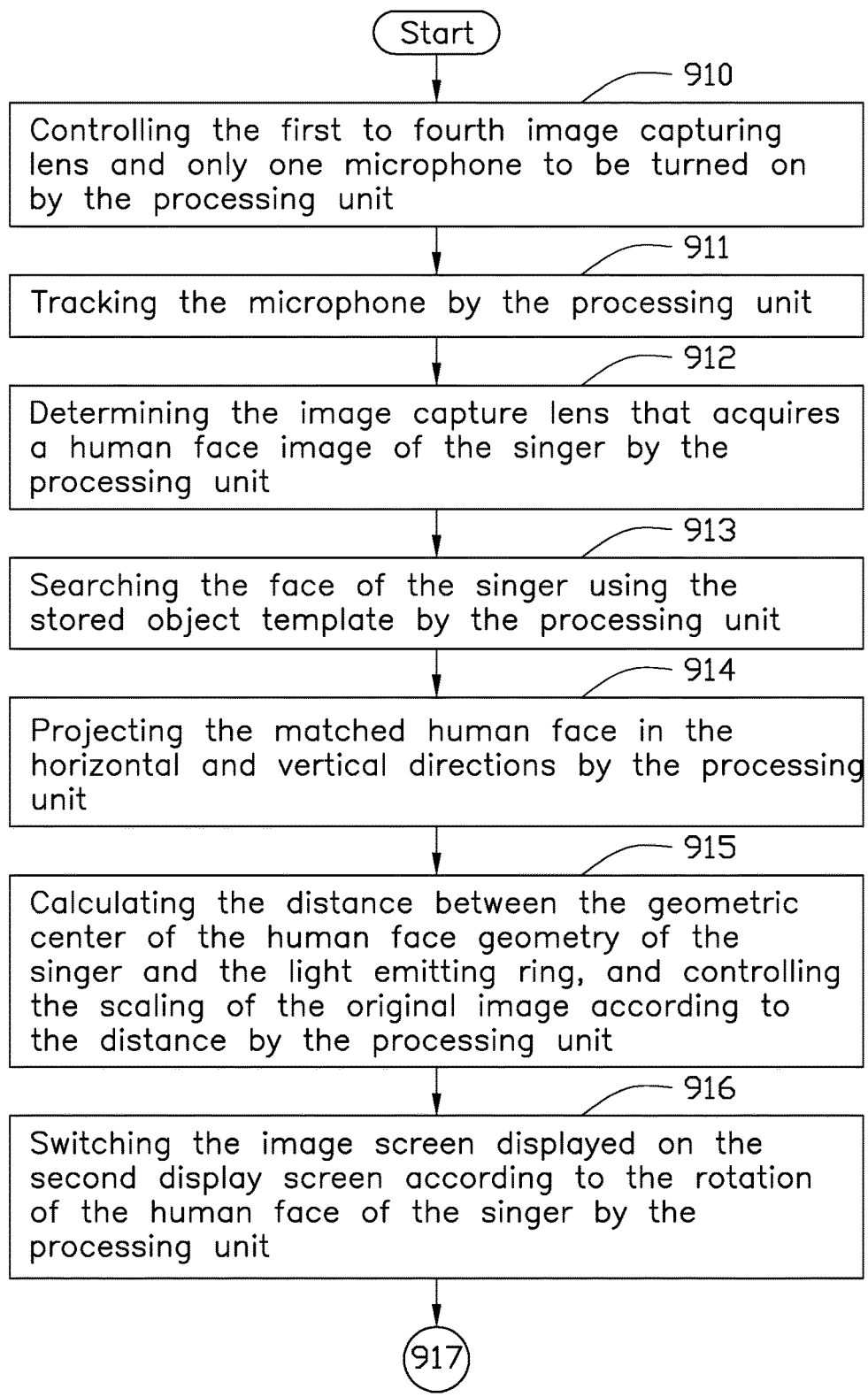
FIG. 12 is a flow diagram of a method for a singer singing alone in the method of FIG. 8.
Figure 13:
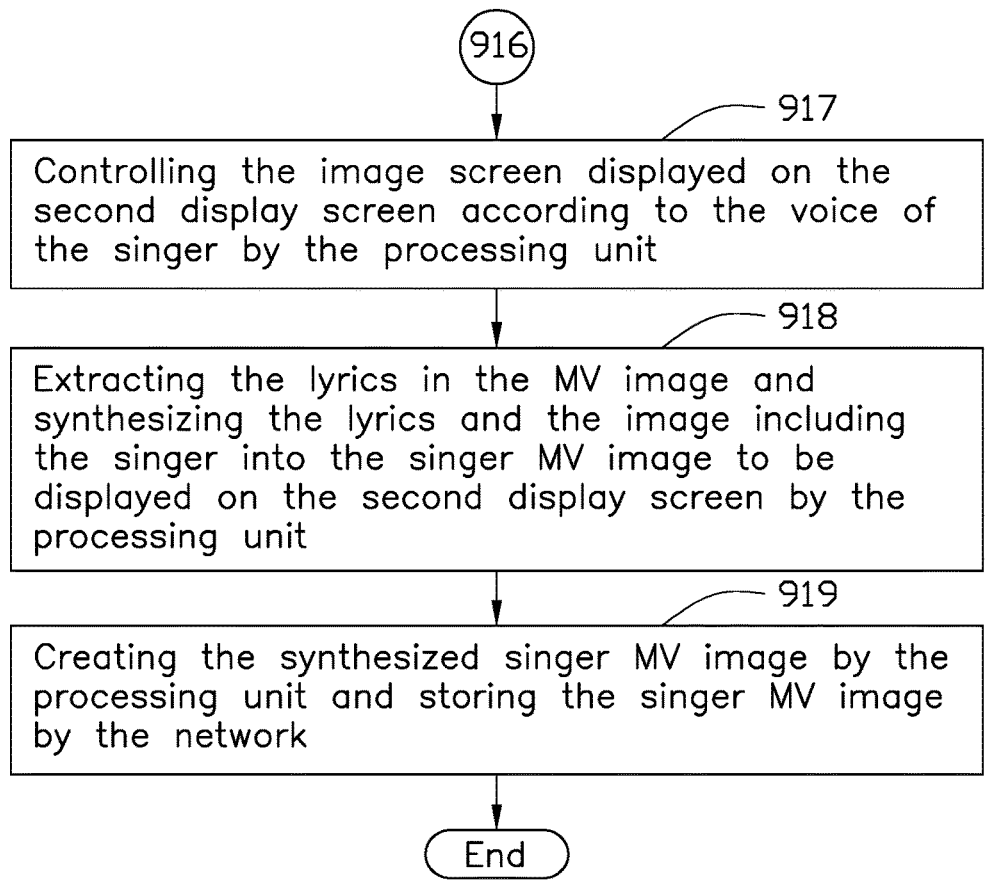
FIG. 13 is a flow diagram of a method for a singer singing alone in the method of FIG. 8.

FIGS. 12 and 13 illustrates that flow diagram of an embodiment of a method for a singer singing alone.

At block 910, the processing unit controls the first to fourth image capturing lenses and turns on only one microphone 70.

At block 911, the processing unit 30 tracks the microphone 70. The image of the light emitting ring 703 is collected through the four image capturing lenses. The microphone 70 after activation can be tracked and positioned.

At block 912, the processing unit determines which image capture lens or lenses that can acquire an image of face of the singer 200. In one embodiment, two of the four image capturing lenses, 101 to 104, faced the singer 200 can acquire the image of the face of the singer 200 and the image of the light emitting ring 703.

At block 913, the processing unit 30 searches the face of the singer 200 using the stored object template 80.

At block 914, the processing unit 30 projects the matched human face in the horizontal and vertical directions, thereby obtaining the geometric center of the human face of the singer 200. At the same time, the processing unit 30 captures the image with the largest human face area of the singer as the original image of the subsequent processing.

At block 915, the processing unit 30 calculates a distance between the geometric center of the human face geometry of the singer and the light emitting ring 703 of the microphone 703, and controls the scaling of the original image according to the distance.

At block 916, the processing unit 30 switches the images displayed on the second display screen 602 according to the rotation of the human face of the singer 200.

The processing unit 30 controls the special effects displayed on the second display screen 602 according to the speed at which the singer's head turns.

When the singer's head rotation speed is less than or equal to a first speed value, it indicates the singer's head rotation is slower, and the use of fade effect makes the screen interface smoother.

When the singer's head rotation speed is more than a first speed value and less than a second speed value, the processing unit 30 controls the screen to use the special effects.

When the singer's head rotation speed is more than the second speed value, the processing unit 30 controls the display to use flight effect to switch special effects rapidly.

At block 917, the processing unit 30 controls the image displayed on the second display screen 602 according to the voice of the singer 200.

The processing unit 30 also selects different conversion effects according to the conversion rate of the song tunes sung by the singer 200.

The processing unit 30 samples the voice of the singer 200.

If the singer's singing voice frequency is faster and the amplitude changes only a little, the singer is singing rap rhythm, and the image on the second display screen 602 is displayed in a pan.

If the singer 200's singing voice frequency is slower and the amplitude changes only a little, the singer 200 is tending to end. The processing synthesizes the image acquired by fifth image capturing lens 105 and the images acquired by the first to fourth video acquisition lenses (101, 102, 103, 104).

If the singer's singing voice frequency is slower and the amplitude changes a lot, the RGB value and the chroma of the image on the second display screen 602 can be adjusted accordingly.

At block 918, the processing unit extracts the lyrics in the MV image, and synthesizes the lyrics and the image, including that of the singer 200, into a singer MV image to be displayed on the second display screen 602.

The MV image is displayed on the first display screen 601, and the image including the singer 200 is acquired by the fifth image capturing lens 105.

At block 919, the processing unit 30 creates a synthesized singer MV image and stores it in the network unit 40 when the song is ended.

The ending of the song is determined by the countdown of the MV image in the first display screen 601.

Figure 14:
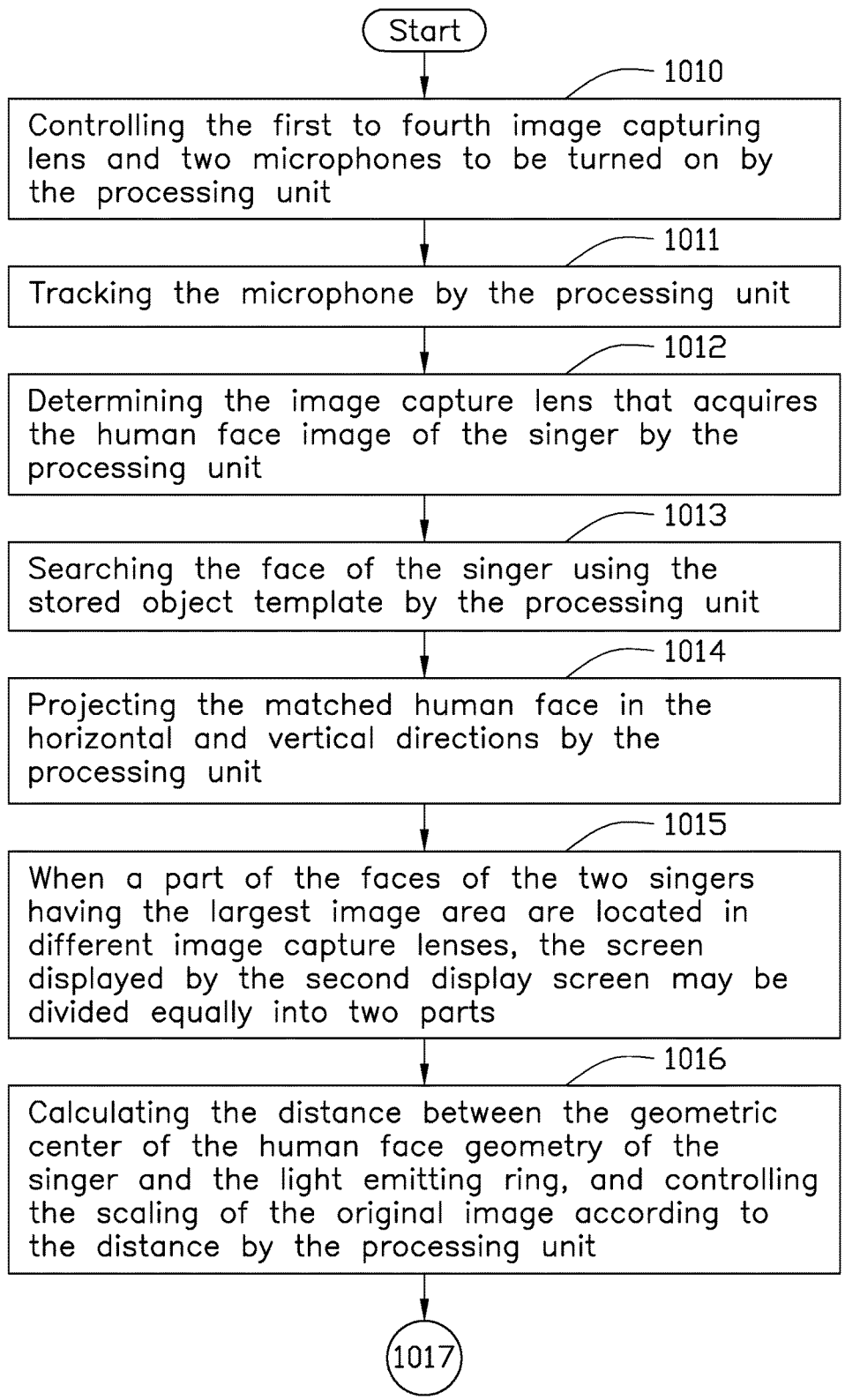
FIG. 14 is a flow diagram of a method for two people or more singing together in the method of FIG. 8.
Figure 15:
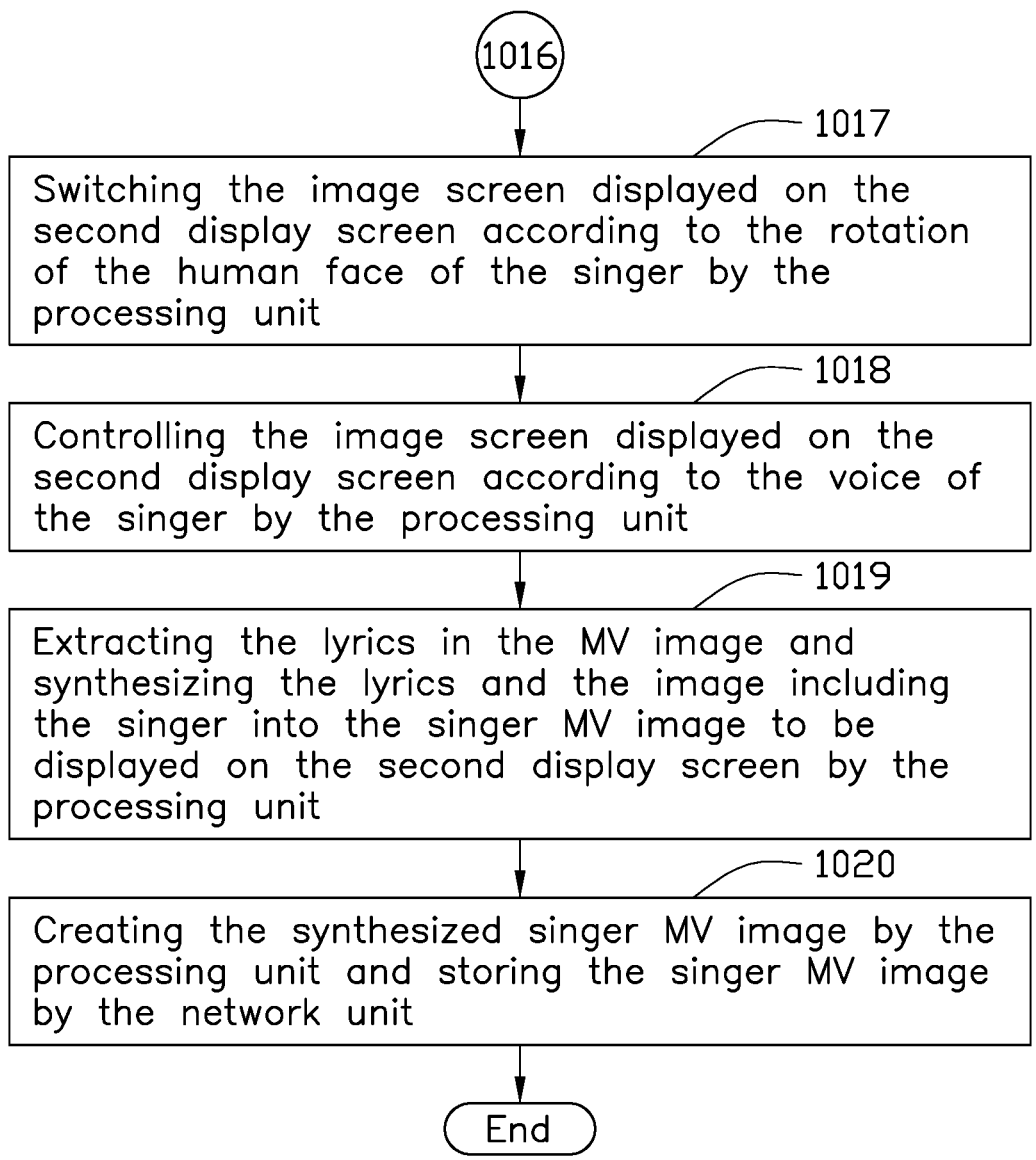
FIG. 15 is a flow diagram of a method for two people or more singing together in the method of FIG. 8.

FIGS. 14 and 15 illustrates a flow diagram of an embodiment of a method for two people or more singing together.

At block 1010, the processing unit controls the first to fourth image capturing lenses and two microphones 70 to be turned on.

In the case of two-people singing, two microphones 70 need to be activated.

At block 1011, the processing unit 30 tracks the microphone 70. The image of the light emitting ring 703 is collected through four image capturing lenses.

At block 1012, the processing unit 30 determines which image capture lenses can acquire an image of the singer's face.

At block 1013, the processing unit 30 searches the singer's face using the stored object template 80.

At block 1014, the processing unit 30 projects the matched human face in the horizontal and vertical directions, thereby obtaining the geometric center of the human face of the singer. At the same time, the processing unit 30 captures the image with the largest human face area of the singer as the original image of the subsequent processing.

At block 1015, when parts of the faces of the two singers having the largest image area are located in different image capture lenses, the display on the second display screen 602 may be divided equally into two parts.

At block 1016, the processing unit 30 calculates a distance between the geometric center of the human face geometry of the singer and the light emitting ring 703 of the microphone 70, and controls the scaling of the original image according to the distance.

When the distance between the geometric center of the human face of the singer and the geometric center of the light emitting ring 703 is less than or equal to a first preset distance, the image on the second display screen 602 is enlarged and centred around the singer's face region. The smaller the distance between the geometric center of the human face of the singer and the geometric center of the microphone 70, the greater is the amount of the image on the second display screen 602 around the singer's face region.

When the distance between the geometric center of the human face of the singer and the geometric center of the light emitting ring 703 is larger than the first preset distance and smaller than the second preset distance, the image on the second display screen 602 is not enlarged in the display. That is, a half-body image of the singer holding the smart microphone 70 is displayed on the second display screen 602.

When the distance between the geometric center of the human face of the singer and the geometric center of the light emitting ring 703 is equal to or greater than the second preset distance, the image on the second display screen 602 is displayed in a reduced size around the singer's face region. That is, a picture of the whole person of the singer is displayed on the second display screen 602.

At block 1017, the processing unit 30 switches the image screen displayed on the second display screen 602 according to the rotation of the face of the singer.

The processing unit 30 controls the special effects displayed on the second display screen 602 according to the speed at which the singer's head turns.

When the singer's head rotation speed is less than or equal to a first speed value, it indicates that the singer's head rotation is slower, and the use of fade effect will make the screen interface smoother.

When the singer's head rotation speed is more than the first speed value and less than a second speed value, the processing unit 30 controls the screen to use the special effects.

When the singer's head rotation speed is more than the second speed value, the processing unit 30 controls the display to use the flight effect, to switch between special effects rapidly.

At block 1018, the processing unit 30 controls the image displayed on the second display screen 602 according to the voice of the singer.

The processing unit 30 also selects different conversion effects according to the conversion rate of the song tunes sung by the singer.

The processing unit 30 samples the voices of the singer 200.

If the singer's singing voice frequency is faster and the amplitude changes only a little, the singer is singing rap rhythm, and the image on the second display screen 602 is displayed in a pan.

If the singer's singing voice frequency is slower, and the amplitude changes only a little, the singer is tending to end.

The processing synthesizes the image acquired by fifth image capturing lens 105 and the images acquired by the first to fourth image capturing lenses (101, 102, 103, 104).

If the singer's singing voice frequency is slower and the amplitude changes a lot, the RGB value and the chroma of the image on the second display screen 602 can be adjusted accordingly.

At block 1019, the processing unit extracts the lyrics of the MV image, and synthesizes the lyrics and the image including the image of the singer into a singer MV image to be displayed on the second display screen 602.

The MV image is displayed on the first display screen 601, and the image including the singer is acquired by the fifth image capturing lens 105.

At block 1020, the processing unit 30 creates a synthesized singer MV image and stores it in the network unit 40 when the song is ended.

The ending of the song is determined by the countdown of the MV image in the first display screen 601.

The embodiments shown and described above are only examples. Many details are often found in the art such as the other features of image production system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An image production system configured for applying to a karaoke television (KTV) room, comprising:
   a background canvas;
   a capturer capturing an image of a singer; and
   a processor receiving the image from the capturer and adjusting the current color of the background canvas according to the clothes color of the singer;
   wherein the processor extracts the lyrics in a music video (MV) image displayed in a first display screen of the KTV room and synthesizes the singer image into a singer MV image, and displays the singer MV image on a second display screen of the KTV room; and
   wherein the image production system further comprises a microphone, the microphone comprises a light emitting ring, the processor extracts a target template of a human face of a singer; the processor tracks the face of the singer according to the extracted target template, and adjusts the scaling of the MV image of the singer according to a distance between the face of the singer and the microphone light emitting ring.

2. The image production system of claim 1, wherein the capturer comprises a first image capturing lens, a second image capturing lens, a third image capturing lens, a fourth image capturing lens, and a fifth image capturing lens; the first image capturing lens, the second image capturing lens, the third image capturing lens, and the fourth image capturing lens are installed in the corners of the KTV room; the fifth image capturing lens is installed at an intermediate position of the first display screen and the second display screen.

3. The image production system of claim 2, wherein the image production system further comprises a lighting unit, the lighting unit comprises a first lamp, a second lamp, a third lamp, a fourth lamp, and a fifth lamp; the first to fourth lamp are installed in the corners of the KTV room, the first to fourth lamp are respectively installed within a preset distance of the first to fourth image capturing lens, and the fifth lamp is installed within a preset distance of the fifth image capturing lens.

4. The image production system of claim 1, wherein the background canvas comprises a first canvas, a second canvas, a first spool, and a second spool, the first canvas adopts a first color and the second canvas adopts a second color; the first spool is configured to roll up or unroll the first canvas, the second spool is configured to roll up or unroll the second canvas.

5. The image production system of claim 1, wherein the image production system further comprises a wireless communication module and a storage, the storage stores the singer MV image, the wireless communication module communicates with a portable communication device.

6. An image production method configured for applying to a KTV room, comprising:
capturing a singer image including a background canvas by a capturer;
receiving the singer image from the capturer and adjusting the current color of the background canvas according to the clothes color of the singer by a processor;
determining the number of the microphone by the processor;
extracting a target template for the face of the singer by the processor;
tracking the face of the singer and the microphone according to the extracted target template, determining a distance between the human face of the singer and the light emitting ring, and adjusting the scaling of the image on the second display screen of the KTV room according to the distance by the processor;
extracting the lyrics in a MV image displayed in a first display screen of the KTV room and synthesizing the singer image into a singer MV image, displaying the singer MV image on a second display screen of the KTV room by the processor, and
saving the singer MV image by a storage.

7. The image production method of claim 6, further comprising:
receiving the singer image comprising the background canvas from a fifth image capturing lens by the processor;
determining the color at the corner of the singer image to determine the current color of the background canvas by the processor;
subtracting each pixel value of the singer image from the pixel value of the current color of the background canvas and performing connectivity process by the processor; and
determining the number of holes in the singer image after the connectivity process and switching the current color of the background canvas if the number of holes is less than a threshold value N by the processor.

8. The image production method of claim 7, further comprising:
receiving the image from the capturer by the processor;
extracting a frame image from the image by the processor;
converting a color space of the extracted frame image by the processor;
performing a binary process and a morphological operation on the frame image after converting the color space by the processor;
counting the number of pixel groups in the image after morphological operations by the processor, and the number of pixel groups is the number of singers; and
projecting each pixel group in the X-axis and Y-axis, and selecting a fixed-size pixel block in the middle of the minimum circumscribed rectangle as the target template by the processor.

9. The image production method of claim 8, wherein when the singer's head rotation speed is less than or equal to a first speed value, it indicates the singer's head rotation is slower, and the use of fade effect makes the screen interface smoother; when the singer's head rotation speed is more than the first speed value and less than a second speed value, the processor controls the screen to use special effect; when the singer's head rotation speed is more than the second speed value, the processor controls the second display screen to use flight effect to switch special effects rapidly.

10. The image production method of claim 9, wherein the processor selects different conversion effects according to the conversion rate of the song tunes sung by the singer; when the voice frequency of the singer is faster and the amplitude changes only a little, the singer is singing rap rhythm, and the image on the second display screen is displayed in a pan; when the singer's singing voice frequency is slower, the amplitude changes little, the processor synthesizes the image acquired by fifth image capturing lens and the image acquired by the first to fourth image acquisition lens; when the voice frequency of the singer is slower and the amplitude changes a lot, the RGB value and the chroma of the image on the second display screen can be adjusted accordingly.

\* \* \* \* \*